(12) United States Patent
Woods (10) Patent No.: US 9,163,312 B2
(45) Date of Patent: Oct. 20, 2015

(54) METHOD OF COLOURING TIN AND TIN-CONTAINING ARTICLES

(75) Inventor: Trish Woods, Plymouth (GB)

(73) Assignee: University of Plymouth (GB)

( * ) Notice: Subject to any disclaimer, the term of this patent is extended or adjusted under 35 U.S.C. 154(b) by 737 days.

(21) Appl. No.: 13/125,510

(22) PCT Filed: Oct. 22, 2009

(86) PCT No.: PCT/GB2009/002529
§ 371 (c)(1),
(2), (4) Date: May 24, 2011

(87) PCT Pub. No.: WO2010/046656
PCT Pub. Date: Apr. 29, 2010

(65) Prior Publication Data
US 2012/0000412 A1    Jan. 5, 2012

(30) Foreign Application Priority Data

Oct. 22, 2008 (GB) .................................. 0819357.5

(51) Int. Cl.
*C23C 22/58* (2006.01)
*C23C 22/68* (2006.01)
*G01K 11/14* (2006.01)
*C23C 22/00* (2006.01)

(52) U.S. Cl.
CPC ................. *C23C 22/58* (2013.01); *C23C 22/68* (2013.01); *G01K 11/14* (2013.01)

(58) Field of Classification Search
None
See application file for complete search history.

(56) References Cited

U.S. PATENT DOCUMENTS

| 3,767,475 A | 10/1973 | Schubert |
| 2003/0159762 A1* | 8/2003 | Beretta ........................ 148/270 |

FOREIGN PATENT DOCUMENTS

| EP | 1336669 A2 | 8/2003 |
| JP | 61128131 A | 6/1986 |

OTHER PUBLICATIONS

International Search Report for PCT/GB2009/002529, 2 pages.
Written Opinion for PCT/GB2009/002529, 4 pages.
United Kingdom Intellectual Property Office Search Report for PCT/GB2009/002529, 2 pages.

* cited by examiner

*Primary Examiner* — Lois Zheng
(74) *Attorney, Agent, or Firm* — Arnold, Knobloch & Saunders, L.L.P.; Jason A. Saunders (57) ABSTRACT

A method of coloring the surface of a tin-containing article is provided, the method comprising contacting at least a portion of the surface of the article with a solution comprising a thiosulphate, preferably under substantially neutral or acidic conditions. In one embodiment, the solution contains sodium thiosulphate and citric acid and further comprises a copper salt, together with acetone and/or glycerol. The method is preferably conducted at elevated temperatures, in particular by heating the solution to a temperature of from 45 to 85° C. The method is particularly suitable for the coloring of pewter articles, but may be applied to a wide range of tin-containing materials and tin alloys.

21 Claims, 6 Drawing Sheets

METHOD OF COLOURING TIN AND TIN-CONTAINING ARTICLES

BACKGROUND OF THE INVENTION

The present invention relates to a method for colouring the surface of tin and tin-containing articles, such as articles of pewter and other alloys of tin.

The colouring of metals is well known, with techniques for the colouring of such metals as copper having been well known for many years. However, comparatively little is known regarding the colouring of tin and tin-containing alloys. In part this is due to the generally high level of inertness exhibited by tin.

Pewter is an alloy of tin, containing from 85 to 99% by weight of tin and from 1 to 15% by weight of copper to provide the alloy with a degree of hardness. Traditionally, lower grades of pewter have contained lead. However, modern trends are to replace the lead with antimony or bismuth. It is known to colour the surface of pewter articles, in particular to darken the article to replicate the dark grey patina of old lead pewter. Specific techniques for darkening the surface of pewter articles are disclosed in Publication No. 566 'Working with pewter', published by the International Tin Research Institute.

U.S. Pat. No. 3,930,898 discloses a process for imparting a dark patina to the surface of an article formed from a low melting metal alloy, including alloys of tin such as pewter. The method comprises exposing the surface of the article to an acid solution of a copper salt, in particular copper sulphate, copper chloride or copper nitrate.

U.S. Pat. No. 6,013,328 concerns a electroless method of antiquing a pewter component, the method comprising contacting the component with an oxidizing solution containing copper chloride, selenious acid, hydrochloric acid and sodium tetradecyl sulphate.

Other techniques for colouring tin and pewter are referred to in the art. Harris, C. 'Colouring Miscellaneous Metals: silver-tin-gold-zinc-cadmium-nickel', Metal Industry, January 1951, pages 71 to 73, describes various electrolytic colouring processes for tin and pewter, similar to those applied to aluminium. Further, various lacquering techniques have been practiced for a number of centuries.

EP 1 336 669 discloses a process for providing a tortoise-shell chromatic effect on a metallic substrate. The process involves heating the metallic substrate to a temperature of from 100° C. up to 140° C. in the presence of an aqueous solution comprising sodium thiosulfate, copper acetate and potassium acid tartarate. The process is particular aimed at the colouring of nickel.

SU 19853912493 concerns the removal of copper from tin alloys by treating with sodium thiosulphate at temperatures from 250 to 500° C.

US 2004/0104122 is directed to a process for the passivating of tin, zinc and steel surfaces by applying a coating of a protective composition. In the case of tin, the coating is of a composition comprising proteins, amino acids and amine alcohols.

JP 2002191421 discloses a process for colouring a gold alloy ornament, in which the surface of the gold alloy is coated in a very thin film of tin and then treated with an aqueous solution of acetic acid, copper sulfate and table salt; ammonium chloride and dilute sulfuric acid; copper sulfate, potassium sulfate, sodium salt and caustic soda; copper sulfate, green rust and alum and a mixed aqueous solution of sodium thiosulfate and lead acetate; copper acetate, copper nitrate, ammonium chloride, alum and mercury (II) chloride, copper (I) carbonate and arsenious acid with a mixed aqueous solution of copper sulfate, alum, mercury (II) chloride, copper nitrate and ammonium chloride. The treatment forms verdigris on the surface of the gold ally ornament.

U.S. Pat. No. 3,767,475 discloses a method of plating metallic articles with tin and treating the tin plating to render it oxidizable. Thereafter, the tin layer is oxidized.

While certain techniques for colouring tin are known, the practice of colouring tin-containing articles is by no means as well developed as with many other metals. As a result, there is a need for a simple method for colouring tin and tin-containing articles, such as pewter articles. It would be an advantage if the method could be applied with only simple modifications to provide a range of different colourations on the surface of the article.

BRIEF SUMMARY OF EXAMPLES OF THE INVENTION

According to a first aspect of the present invention there is provided a method for colouring the surface of a tin-containing article, the method comprising contacting the surface of the article with a solution of a thiosulphate salt.

It has been found that a solution of a thiosulphate salt causes the surface of the tin article to change colour, in particular to take on a gold colour. The intensity and particular hue of the colour will depend upon the specific conditions under which the surface is treated, as will be described hereinafter. As a result, the method of the present invention allows a tin-containing article to have its surface treated to give it a wide range of colourations. It has further been found that the colouration of the surface is sufficiently stable and resistant to form a permanent colouration of the article.

The method of the present invention may be applied to a wide range of tin-containing materials. The material may consist substantially entirely of tin. Alternatively, the material may be an alloy of tin. In this case, the material should contain tin as the major component, in particular greater than 50% by weight, preferably more than 60%, more preferably more than 75% by weight, especially more than 80%. The method of the invention is particularly suitable for application to pewter articles. The method may be applied to the entire range of pewters, that is alloys of tin and copper containing from 85 to 99% by weight of tin, optionally with the inclusion of lead, antimony and/or bismuth.

The method employs a solution of a thiosulphate salt. The solution is most preferably an aqueous solution.

The thiosulphate salt may be any suitable thiosulphate salt. It has been found that thiosulphates of monovalent cations are particularly suitable. Preferred salts are thiosulphates of alkali metals, in particular potassium and sodium. Ammonium thiosulphate is a further preferred thiosulphate salt for use in the method of the present invention.

The solution may contain the thiosulphate in any suitable amount. Preferably, the thiosulphate is present in the solution at a concentration in the range of from 5 to 50 g per 100 ml, more preferably from 10 to 40 g per 100 ml, especially from 20 to 30 g per 100 ml of solution. A concentration of about 25 g per 100 ml of solution is particularly suitable.

The thiosulphate solution may be contacted with the surface of the tin article under a range of pH conditions. Preferably, the solution is not strongly alkali, that is having a pH substantially higher than 7. Rather, it is preferred that the tin is contacted with the thiosulphate solution under substantially neutral or acidic conditions, that is a pH below 7. In one embodiment, it is preferred that the conditions are mildly acidic, with the preferred pH range being from 5 to 6, more preferably from 5 to 5.5. It has been found that the colouration of the tin article can depend upon the pH of the thiosulphate solution. In particular, to achieve gold colouration, the pH value is preferably in the range of from 5 to 5.5. The addition of components, such as copper sulphate, to achieve blue and green colours generally increases the pH to around 7.

The acidic conditions may be obtained by the presence of any suitable acidic compound or compounds in the solution. It is preferred that the acidic conditions are obtained by the presence of a weak acid. In this respect, a weak acid is an acid having a Ka value of from about $10^{-3}$ to $10^{-10}$. Suitable weak acids include organic acids, with acetic acid and citric acid being particularly preferred.

The method of the present invention may be performed with a solution consisting of a thiosulphate salt, a suitable solvent and a component to provide the required acidity. However, it has been found that the addition of one or more components can provide the colouration of the surface with increased stability, in particular when using an aqueous thiosulphate solution. Such stabilizers include organic solvents, in particular aldehydes and ketones, especially ketones. Lower organic solvents are preferred, that is compounds having from 3 to 8 carbon atoms. A particular preferred stabilizer is acetone or butanone. It has been found that the inclusion of acetone in an aqueous thiosulphate solution imparts a significant stability to the colouration. It has been observed that the acetone acts as a wetting agent for the surface being treated, ensuring that the thiosulphate solution contacts the surface.

Aldehydes and ketones may be present in the thiosulphate solution in any suitable amount. Preferably, the aldehydes and ketones are present in an amount in the range of from 0.5 to 10 ml per 100 ml of solution, more preferably from 1 to 5 ml, especially from 1.5 to 2.5 ml per 100 ml of solution.

Alternatively, or in addition, to the aforementioned stabilizers, the thiosulphate solution may contain one or more alcohols, in particular a polyol. Lower alcohols are preferred, that is compounds having from 3 to 8 carbon atoms. A particularly preferred polyol is glycerol. It has been found that the inclusion of a polyol, such as glycerol the layer of colouration on the surface of the tin article is generally of greater thickness. It has been observed that a thicker layer of colouration can provide the surface with a wider range of effects, in particular arising from light interference patterns.

One or more polyols may be present in the thiosulphate solution in a suitable amount. Preferably, if employed, the polyol is present in an amount in the range of from 0.1 to 2 ml per 100 ml of solution, more preferably from 0.5 to 1.5 ml, especially from 0.75 to 1.25 ml per 100 ml of solution. A particularly suitable concentration for the polyol is about 1 ml per 100 ml of solution.

As noted above, the use of a thiosulphate solution, optionally with an aldehyde or ketone, and/or a polyol, results in the surface of the tin article taking on a colour with a gold hue. Other colours may be obtained by the addition of further components to the thiosulphate solution. In particular, the addition of one or more copper salts results in the surface having one or a mixture of pink, blue and green colouration. Suitable copper salts include copper sulphate and copper acetate.

One or more copper salts may be present in the thiosulphate solution in a suitable amount. If present, the copper salts are present an amount in the range of from 1 to 15 g per 100 ml of solution, more preferably 2 to 10 g per 100 ml, especially 3 to 8 g per 100 ml. Concentrations of copper salt in the range of from 3 to 6 g per 100 ml of solution are particularly preferred.

The thiosulphate solution is preferably contacted with the surface of the tin article at an elevated temperature. It has been found that the method of the present invention provides a colouration of the surface that develops only very slowly, if at all, at temperatures of ambient or below. Elevated temperatures have been found to be necessary to allow the surface to develop a colouration in an acceptable period of time. Elevated temperatures are most suitably applied by heating the thiosulphate solution. Preferred temperatures for conducting the method are at least 30° C., more preferably at least 40° C. It is preferred that the temperature is below 100° C., more preferably below 90° C. In any event, the temperature should not exceed the boiling point of the solvent.

A preferred temperature is in the range of from 45 to 85° C., more preferably from 55 to 70° C.

The thiosulphate solution is most preferably contacted with the surface of the tin article while being agitated. For example, the agitation may be achieved by the motion of the tin article being immersed in the solution and removed. Other forms of agitation may also be applied, if required. Suitable agitation techniques will be known to the person skilled in the art.

It has been found that the form of the colouration of the surface of the tin article will change over time while the thiosulphate solution is in contact with the surface, depending upon the prevailing conditions, such as acidity, salt content and temperature. In general, the colouration of the surface of the tin develops according to the following schedule:

GOLD to PINK to BLUE to GREEN

A particular colouration may be obtained by conducting the method until the desired colour or combination of colours has been obtained and then removing the solution from contact with the surface. If further colouration is required, the surface may be further contacted with the thiosulphate solution to move the colouration further along the progression set out above.

The time for contacting the thiosulphate solution with the tin surface will vary according to the colouration to be obtained, the components of the solution and the temperature. In general contact times in the range of from 1 to 20 minutes, more preferably from 1 to 10 minutes. Very good results have been obtained with contact times of from 2 to 4 minutes. Shorter or longer contact times may be required, depending upon the conditions applied and the result to be achieved. In particular, lower temperatures will require a longer contact time in order to achieve a particular colouration.

Once the desired colouration has been obtained, it is preferred to quench the colouration reactions by washing the surface of the tin article with a cold solvent, most suitably water. In this way, the desired colouration of the surface can be fixed.

The hardness of the surface colouration may be determined using any standard test. One preferred technique uses a range of pencils of different hardness, as described in the examples hereinafter. It has been found that the colouration of the surface can be prepared with a hardness of at least an HB pencil. This is generally recognized as being a stable and resistant surface.

The surface of the tin article may have a suitable coating applied after treatment with the thiosulphate solution, in order to enhance and protect the colouration. Suitable coatings include varnish, in particular acrylic varnishes, and wax.

The surface of the tin article should preferably be cleaned prior to contact with the thiosulphate solution, in particular with a degreasing agent. Suitable cleaning and degreasing agents are well known in the art and commercially available. The surface of the tin article may be smooth, for example a polished surface. Alternatively, the surface may be rough or contoured, for example as may result from sand blasting and the like.

As noted above, it has been found that the colouration of the surface of the tin article is dependent upon the colouring composition being heated. In particular, at low or ambient temperatures no significant colouration arises. It has been found that this effect may be used, by employing a tin-containing article or component treated as hereinbefore described, to detect the presence of an elevated temperature of the article. In particular, once treated, such articles have been found to indicate an increase in temperature by displaying a change of colour.

Accordingly, in a further aspect, the present invention provides a method of identifying an elevation in temperature in a tin article, the method comprising monitoring the colour of the surface of the tin article, at least a portion of the surface being monitored having been treated at ambient temperature according to a method as hereinbefore described.

An indication of the elevated temperature achieved may be obtained from an analysis of the particular colouration of the surface of the article.

DETAILED DESCRIPTION OF EXAMPLES OF THE INVENTION

Embodiments of the present invention will now be described by way of the following examples, presented here for illustrative purposes only. Images of the treated samples are set out in the accompanying FIGS. 1 to 6, details of which are described in the examples.

EXAMPLES

Example 1

A treatment solution was prepared as follows:
Ammonium thiosulphate (50 g) was dissolved in distilled water (200 ml) with stirring. Butanone (5 ml) was added and the resulting mixture further agitated. Citric acid was added, again with stirring, until a pH of 5 was achieved. The resulting solution was heated to between 60 to 80° C.

A sample of pewter was coloured using the solution prepared above, as follows:
The pewter sample was immersed in the solution with gentle agitation. The sample was periodically removed to observe the change in colour. It was found that the surface of the pewter took up a pale gold colour after immersion in the solution for 1 to 2 minutes. After immersion in the solution for 5 to 10 minutes, the surface colour of the pewter sample was a bright gold.

The pewter sample was removed from the solution and rinsed in clean, cold water. To prevent the formation of water marks, the sample was rapidly dried using a stream of hot air.

The hardness of the surface colouration was measured as follows:
A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

Figure 1:
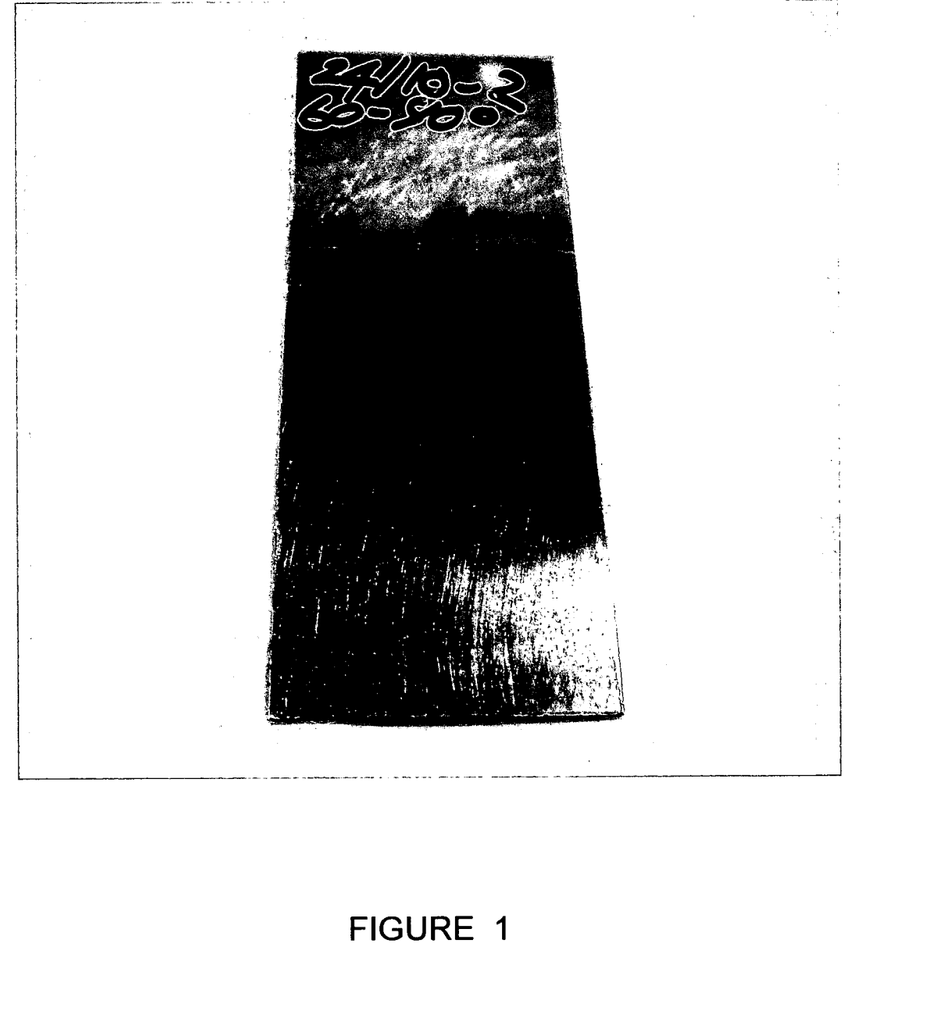
FIG. 1 shows a sample of pewter treated by a method following one embodiment of the present invention.

The surface of the pewter sample was sealed using a wax.
The treated sample of pewter is shown in FIG. 1. The surface of the sample was a bright gold colour.

Example 2

A treatment solution was prepared as follows:
Sodium thiosulphate (50 g) was dissolved in distilled water (200 ml) with stirring. Copper acetate (12 g) was added with stirring. Acetone (5 ml) was added and the resulting mixture further agitated. The resulting solution was heated to 60° C.

A sample of pewter was coloured using the solution prepared above, as follows:
The pewter sample was immersed in the solution with gentle agitation. The sample was periodically removed to observe the change in colour. It was found that the surface of the pewter took on a progression of colours ranging through pale gold, pink, blue and green. The first phase of colour development occurred rapidly, with the later colours in the progression developing more slowly but brighter. Colour development tended to slow at the gold stage. Some blue colour became evident if the sample was left in contact with the solution a little longer. The final colour of the sample was a green/gold colouration.

The pewter sample was removed from the solution and rinsed in clean, cold water. To prevent the formation of water marks, the sample was rapidly dried using a stream of hot air.

The hardness of the surface colouration was measured as follows:
A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

The surface of the pewter sample was sealed using a clear acrylic lacquer.

Figure 2:
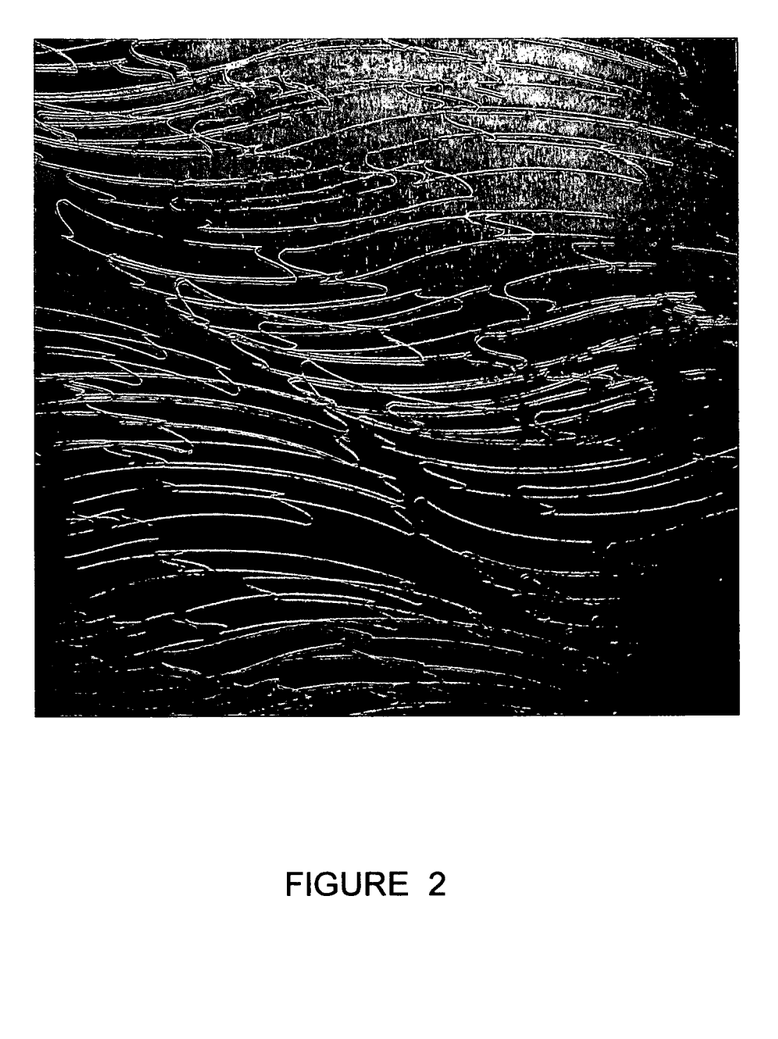
FIG. 2 shows a sample of pewter treated by a method following a second embodiment of the present invention.

The treated sample of pewter is shown in FIG. 2. The surface of the sample was a gold colour with green hues.

Example 3

A treatment solution was prepared as follows:
Ammonium thiosulphate (50 g) was dissolved in distilled water (200 ml) with stirring. Copper acetate (12 g) was added with stirring. Acetone (5 ml) was added, again with stirring. The resulting solution was heated to between 50° and 60° C.

A sample of pewter was coloured using the solution prepared above, as follows:
The pewter sample was immersed in the solution with gentle agitation. The sample was periodically removed to observe the change in colour. It was found that the surface of the pewter took on a cycle of colour changes from gold to pink to purple to blue then fading to pale green gold. The colour change was rapid with a brighter second colour cycle occurring. The blue/purple colouration appears the most even. The sample was removed at the desired stage of colour development and rinsed in cold water. The sample was rapidly dried in a stream of air then sealed with a clear acrylic varnish.

The hardness of the surface colouration was measured as follows:

A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

Figure 3:
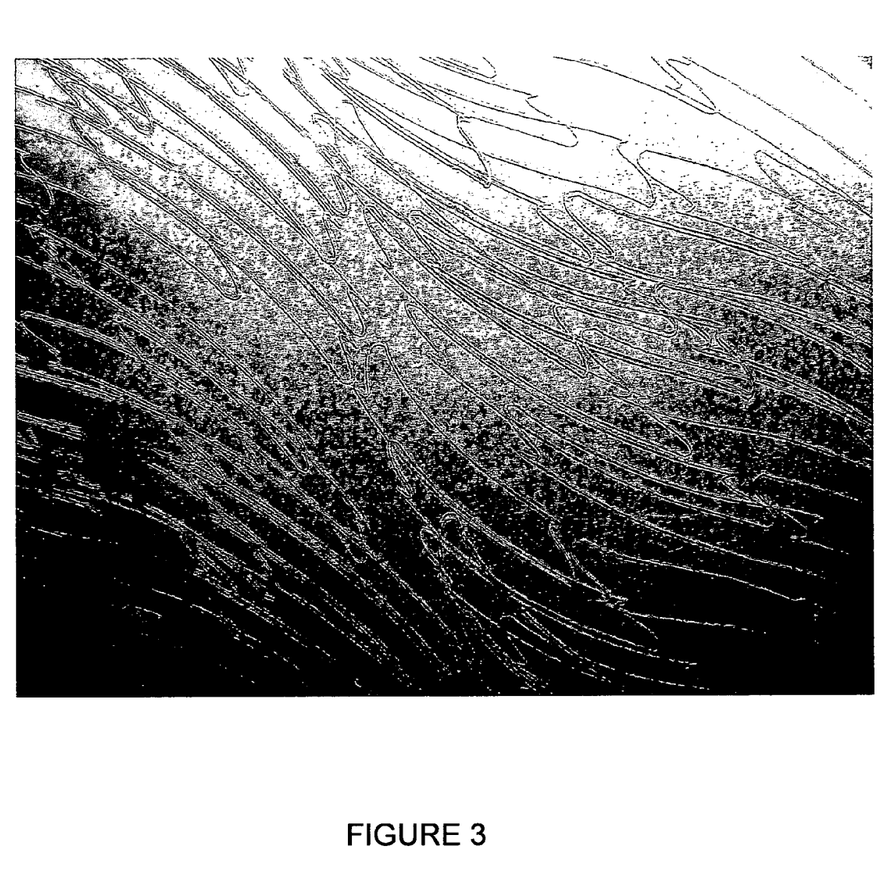
FIG. 3 shows a sample of pewter treated by a method following a third embodiment of the present invention.

The treated sample of pewter is shown in FIG. 3. The surface of the sample was a blue/purple colour.

Example 4

A treatment solution was prepared as follows:

Ammonium thiosulphate (50 g) was dissolved in distilled water (200 ml) with stirring. Copper acetate (12 g) was added with stirring. Acetic Acid (3 gms) was added with stirring. Acetone (5 ml) was added, again with stirring. The resulting solution was heated to between 50° and 60° C.

A sample of pewter was coloured using the solution prepared above, as follows:

The pewter sample was immersed in the solution with gentle agitation. The sample was periodically removed to observe the change in colour. It was found that the surface of the pewter took on a cycle of variegated colour changes from gold to pink to purple to blue then fading to pale green gold. The colour change was rapid with a second colour cycle occurring. A variegated pink and blue was obtained. The sample was removed at the desired stage of colour development and rinsed in cold water. The sample was rapidly dried in a stream of air and then sealed with a clear acrylic varnish.

The hardness of the surface colouration was measured as follows:

A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

Figure 4:
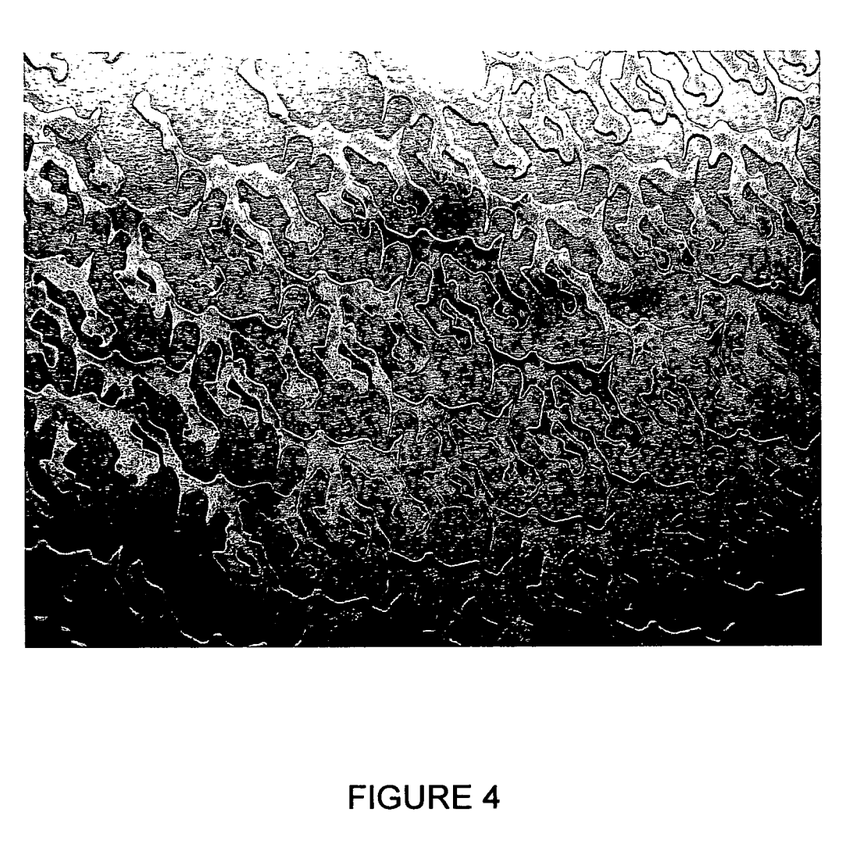
FIG. 4 shows a sample of pewter treated by a method following a fourth embodiment of the present invention.

The treated sample of pewter is shown in FIG. 4. The surface of the sample was a variegated blue and pink colour.

Example 5

A treatment solution was prepared as follows:

Sodium thiosulphate (50 g) was dissolved in distilled water (200 ml) with stirring. Copper acetate (10 g) was added with stirring. Acetone (3 ml) was added with stirring. The pH value was measured at 7.2. The resulting solution was heated to between 50° and 60° C.

A sample of tin was coloured using the solution prepared above, as follows:

The tin sample was immersed in the solution with gentle agitation. The sample was periodically removed to observe the change in colour. It was found that the surface of the tin took on a cycle of rapid colour changes from gold to pink to green occurred within 2 minutes, then continued to repeat. It was further found that, if the sample was left in the solution the colour changed until reaching a dull gray. The sample was removed at the desire stage, rinsed in cold water, dried rapidly in a stream of air and then sealed with a clear acrylic varnish.

The hardness of the surface colouration was measured as follows:

A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

Figure 5:
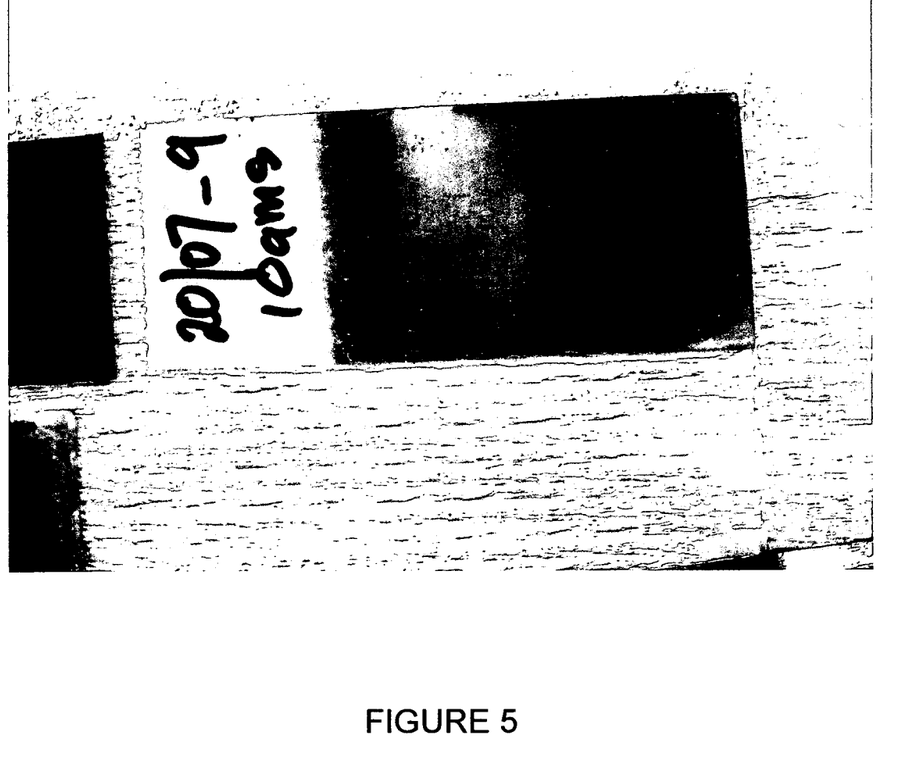
FIG. 5 shows a sample of tin treated by a method following a fifth embodiment of the present invention.

The treated sample of tin is shown in FIG. 5. The surface of the sample in FIG. 5 displayed the range of colours from gold to pink to green.

Example 6

A treatment solution was prepared as follows:

Ammonium thiosulphate (50 g) was dissolved in distilled water (200 ml) with stirring. Copper acetate (5 g) was added with stirring. Butanone (5 ml) was added with stirring. The pH value was measured at 7. The resulting solution was heated to between 60° and 80° C.

A sample of tin was coloured using the solution prepared above, as follows:

The tin sample was immersed in the solution with gentle agitation. The sample was periodically removed to observe the change in colour. It was found that the surface of the tin underwent a series of rapid colour changes from gold to pink to blue to green, occurring within 30 seconds. If allowed to continue, it was found the colour cycle continues to repeat until reaching a dull gray. The sample was removed at the desired stage in the colour cycle, rinsed in cold water, dried rapidly in a stream of air then sealed with a clear acrylic varnish.

The hardness of the surface colouration was measured as follows:

A series of pencils having pencil lead of increasing hardness ranging from 4B to 4H were used to draw lines on the coloured surface. The pencils were used in order of increasing hardness starting with the softest (4B). It was found that the surface colouration started to be removed by the pencil of hardness HB.

Figure 6:
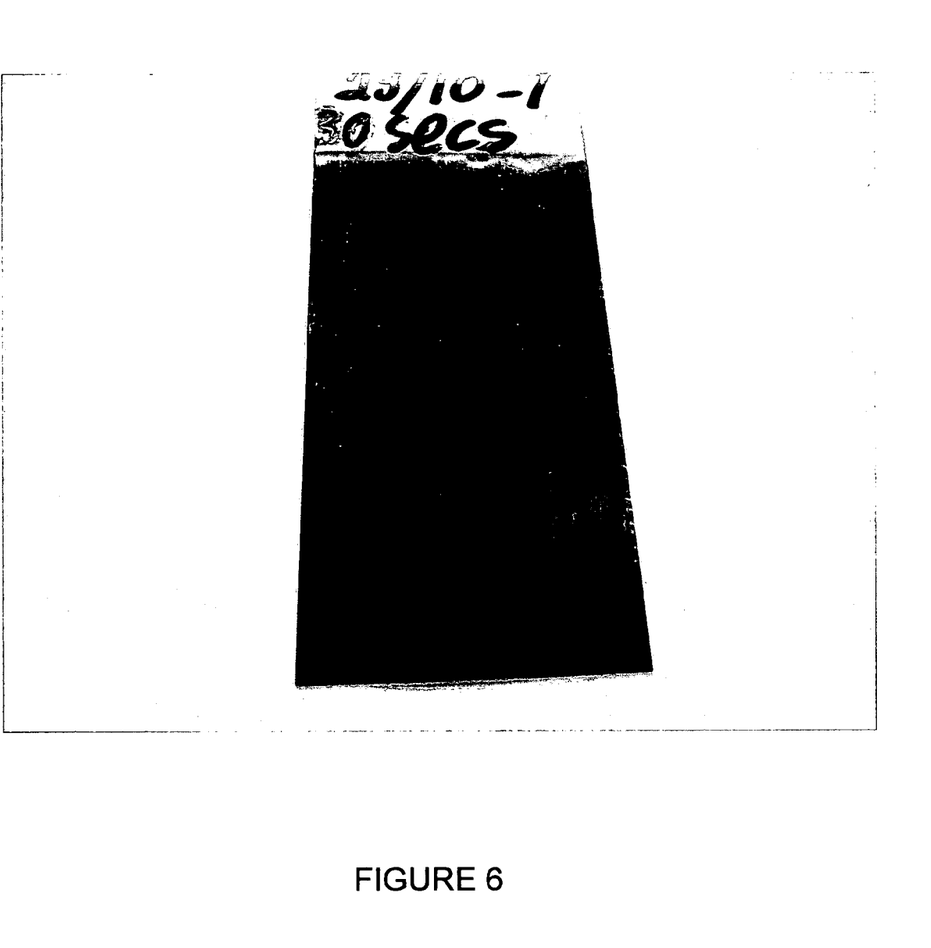
FIG. 6 shows a sample of tin treated by a method following a sixth embodiment of the present invention.

The treated sample of tin is shown in FIG. 6. The surface of the sample in FIG. 5 displayed the range of colours from gold to pink to blue to green.

The invention claimed is:

1. A method of colouring the surface of a tin-containing article, the method comprising contacting at least a portion of the surface of the article with an aqueous solution comprising a thiosulphate and a polyol;
   wherein the thiosulphate is present in the solution in an amount in the range of from 5 to 50 g per 100 ml;
   wherein the polyol is present in an amount of from 0.1 to 2 ml per 100 ml of solution; and
   wherein the solution further comprises an aldehyde or a ketone, the aldehyde or ketone present in the solution in an amount of from 0.5 to 10 ml per 100 ml of solution.

2. The method according to claim 1, wherein the tin article comprises at least 50% by weight tin.

3. The method according to claim 2, wherein the tin article comprises at least 75% by weight tin.

4. The method according to claim 1, wherein the tin article comprises an alloy of tin.

5. The method according to claim 4, wherein the tin article is of pewter.

6. The method according to claim 1, wherein the thiosulphate is a salt of a monovalent cation.

7. The method according to claim 6, wherein the monovalent cation is an alkali metal or ammonium.

8. The method according to claim 7, wherein the monovalent cation is sodium or potassium.

9. The method according to claim 1, wherein the solution is substantially neutral or acidic.

10. The method according to claim 9, wherein the solution has a pH of from 5 to 5.5.

11. The method according to claim 1, wherein the solution is acidic and comprises a weak acid in the solution.

12. The method according to claim 3, wherein the weak acid is selected from the group consisting of acetic acid and citric acid.

13. The method according to claim 1, wherein the solution comprises acetone.

14. The method according to claim 1, wherein the solution comprises glycerol.

15. The method according to claim 1, wherein the solution comprises a copper salt.

16. The method according to claim 15, wherein the copper salt is selected from copper sulphate or copper acetate.

17. The method according to claim 15, wherein the copper salt is present in an amount of from 1 to 15 g per 100 ml of solution.

18. The method according to claim 1, wherein the article is contacted with the solution at an elevated temperature.

19. The method according to claim 18, wherein the solution is heated to a temperature of from 45 to 85° C.

20. The method according to claim 1, further comprising quenching the surface of the article once contact with the solution has ceased.

21. The method according to claim 20, wherein the surface is quenched using cold water.

* * * * *